United States Patent
Prodan (10) Patent No.: US 8,776,155 B2
(45) Date of Patent: Jul. 8, 2014

(54) ADAPTIVE TILT COMPENSATION OF UPSTREAM CHANNEL IN HIGH SPEED DATA NETWORKS

(75) Inventor: Richard Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 74 days.

(21) Appl. No.: 13/453,533

(22) Filed: Apr. 23, 2012

(65) Prior Publication Data
US 2013/0107921 A1    May 2, 2013

Related U.S. Application Data

(60) Provisional application No. 61/478,337, filed on Apr. 22, 2011.

(51) Int. Cl.
*G08C 15/00* (2006.01)
*H04B 1/38* (2006.01)
*H04N 7/173* (2011.01)

(52) U.S. Cl.
USPC .............. 725/111; 375/222; 370/252

(58) Field of Classification Search
None
See application file for complete search history.

(56) References Cited

U.S. PATENT DOCUMENTS

| | | | | |
|---|---|---|---|---|
| 6,453,472 B1* | 9/2002 | Leano et al. | | 725/111 |
| 6,587,514 B1* | 7/2003 | Wright et al. | | 375/296 |
| 7,120,123 B1* | 10/2006 | Quigley et al. | | 370/252 |
| 7,295,518 B1* | 11/2007 | Monk et al. | | 370/235 |
| 2001/0055319 A1* | 12/2001 | Quigley et al. | | 370/480 |
| 2004/0163119 A1* | 8/2004 | Kay | | 725/111 |
| 2005/0122996 A1* | 6/2005 | Azenkot et al. | | 370/477 |
| 2006/0230425 A1* | 10/2006 | Shani et al. | | 725/117 |
| 2007/0213014 A1* | 9/2007 | Meacham et al. | | 455/69 |
| 2009/0133083 A1* | 5/2009 | Klein et al. | | 725/111 |
| 2010/0154017 A1* | 6/2010 | An et al. | | 725/111 |

OTHER PUBLICATIONS

CabeLabs, "DOCSIS 3.0 Physical Layer Specification", Jan. 21, 2009.*

* cited by examiner

*Primary Examiner* — Nathan Flynn
*Assistant Examiner* — William J Kim
(74) *Attorney, Agent, or Firm* — Sterne, Kessler, Goldstein & Fox P.L.L.C.

(57) ABSTRACT

Embodiments provide solutions to reduce power utilization (either at individual cable modems or in the overall network) in future cable networks. Particularly, embodiments seek to reduce power utilization at individual cable modems and in the overall network, by pre-compensating upstream transmissions according to feedback channel characteristics received from the headend. According to embodiments, pre-compensation is performed using power filtering/amplification and/or bit loading. Pre-compensation can be performed individually per cable modem. Further, pre-compensation can be performed over the entire upstream frequency spectrum and/or over particular sub-hands of the frequency spectrum as appropriate for each cable modem.

21 Claims, 9 Drawing Sheets

ADAPTIVE TILT COMPENSATION OF UPSTREAM CHANNEL IN HIGH SPEED DATA NETWORKS

CROSS-REFERENCE TO RELATED APPLICATION(S)

The present application claims the benefit of U.S. Provisional Application No. 61/478,337, filed Apr. 22, 2011, entitled "Adaptive Tilt Compensation of Upstream Channel in High Speed Data Networks," which is incorporated herein by reference in its entirety.

FIELD OF THE INVENTION

The present disclosure relates generally to high speed data networks over hybrid fiber coaxial (HFC) cable plant.

BACKGROUND

Background Art

There is a need for techniques that enhance power utilization in high speed data networks.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
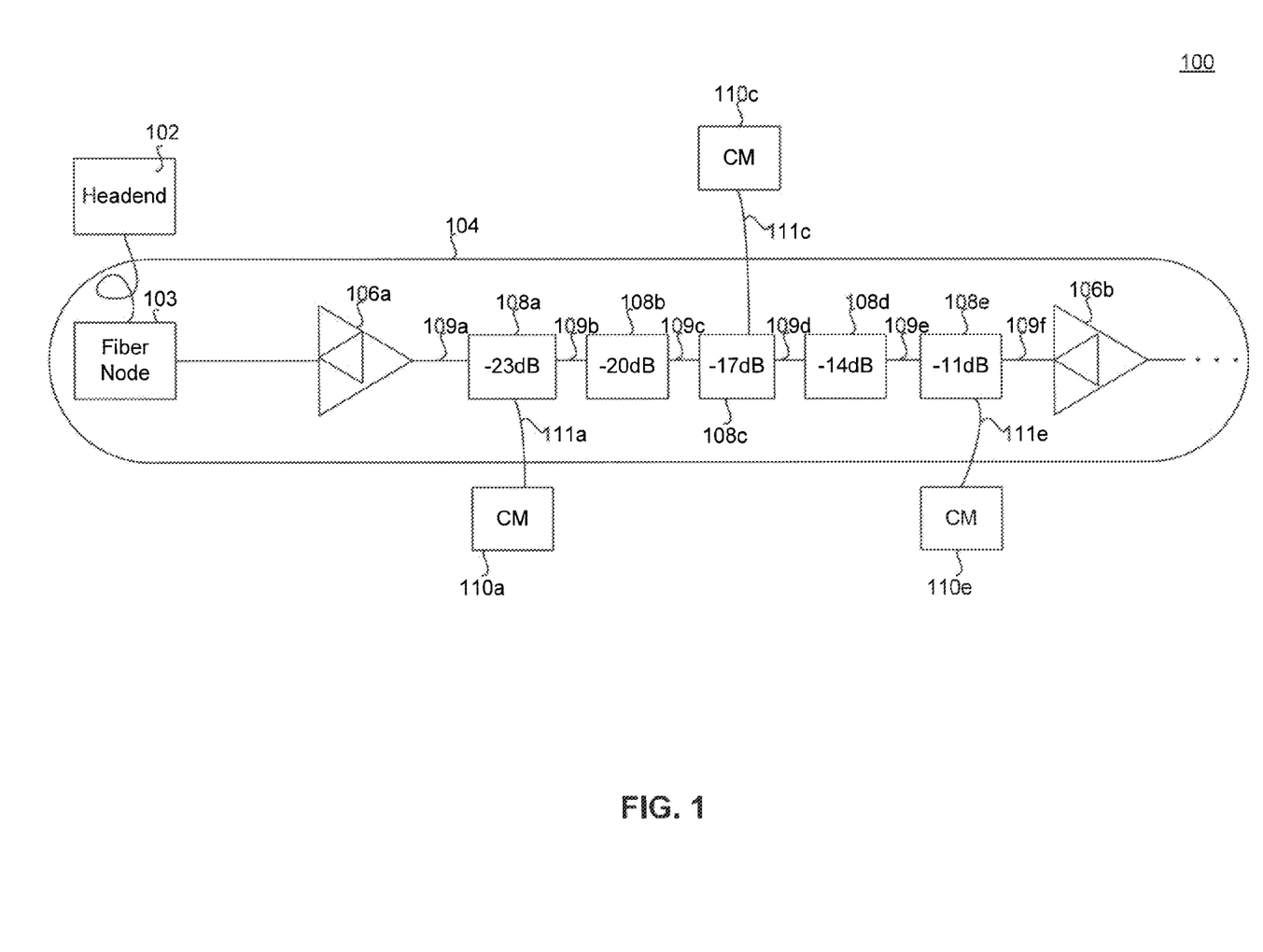
FIG. 1 illustrates an example cable network.

FIG. 1 illustrates an example cable network 100. As shown in FIG. 1, example network 100 includes a headend 102 that serves a plurality of cable modems (CMs) 110. Headend 102 is connected to CMs 110 via a hybrid fiber coaxial (HFC) network 104.

HFC network 104 includes, in the coaxial portion of the network, high power amplifiers or repeaters 106 to ensure that upstream and downstream signals along a service line are received with sufficient signal strength. Typically, repeaters are placed along the service line at a design distance from one another (e.g., 1000 feet). Between repeaters, a plurality of taps 108 are placed, as needed, to provide individual cable drops from the service line to CMs 110. For example, as shown in FIG. 1, tap 108a is used to provide a cable drop to CM 110a.

In the downstream (i.e., from the headend to the CMs), the signal from amplifier 106a drops in terms of signal strength (e.g., by 3 dB) after each cable drop is made from the service line as well as due to cable loss. As such, taps 108 are configured to provide different respective signal attenuation levels as illustrated in FIG. 1, for example, to ensure that the CMs receive similar downstream signal strength irrespective of location relative to amplifier 106a. Specifically, the values of taps 108 are selected to provide uniform signal power levels at the outputs of all taps 108.

In the upstream, because of the different attenuation levels provided by taps 108, the CMs (e.g., DOCSIS CMs) must use a wide range of transmission power levels in order to have their signals received with equal signal strength at headend 102. For example, in FIG. 1, CM 110a must transmit at a power level that is approximately 12 dB higher than that of CM 110e, in order for CMs 110a and 110e to have equal signal strength at headend 102. Even though signal power attenuation in coaxial cable is proportional to the square of the frequency, the frequency spectrum designated for upstream communications in conventional cable networks is at the low band of 5-42 MHz (e.g., DOCSIS), which is sufficiently low so as not to substantially affect signal strength. Higher return band frequencies will exhibit higher attenuation in the coax cable (e.g., 50 to 200 MHz or 1000 to 1150 MHz), especially in the drop cable connecting the CM 110 to the tap 108.

It is envisioned that in future cable networks the frequency spectrum for upstream communications will be expanded into much higher frequency bands (e.g., over 1 GHz). As such, signal attenuation due to cable loss will become significant for upstream communication in the higher frequency bands, and will also cause signals at the headend 102 to have widely varying signal strengths as signals will experience different cable attenuations depending on the frequency bands over which they are transmitted.

Existing conventional solutions typically deal with similar problems by having the CMs use as much transmission power as needed to achieve a desired signal strength at the headend. Thus, conventional solutions are highly sub-optimal in terms of power utilization.

Embodiments of the present disclosure, as further described below, provide solutions that reduce power utilization (either at individual CMs or in the overall network) in future cable networks. Particularly, embodiments seek to reduce power utilization at individual cable modems and in the overall network, by pre-compensating upstream transmissions according to feedback channel characteristics received from the headend. According to embodiments, pre-compensation is performed using power filtering/amplification and/or bit loading. Pre-compensation can be performed individually per cable modem. Further, pre-compensation can be performed over the entire upstream frequency spectrum and/or over particular sub-bands of the frequency spectrum as appropriate for each cable modem.

Detailed description of example embodiments will now be provided. These example embodiments are provided for the purpose of illustration and are not limiting. For example, embodiments are described with reference to a cable network, but are not limited as such. As would be understood by a person of skill in the art, embodiments may be used in any type of network that can benefit from pre-compensating transmissions to enhance individual node and/or overall power utilization.

As noted above, embodiments recognize that, in future cable networks using expanded upstream frequency spectra (e.g., which include both the traditional 5-42 MHz band and additional higher frequency bands from 42 to several hundred MHz as well as frequency bands over 1 GHz), the frequency band over which a particular signal is transmitted will significantly affect the signal's strength at the headend. In other words, embodiments recognize that the coaxial cable length (i.e., the location of the cable modem from the headend) will be a significant contributor to the attenuation of transmitted upstream signals at high frequencies, but only negligibly affects signal attenuation at low frequencies. At the same time, however, higher frequency bands will generally have lower noise levels.

Figure 2:
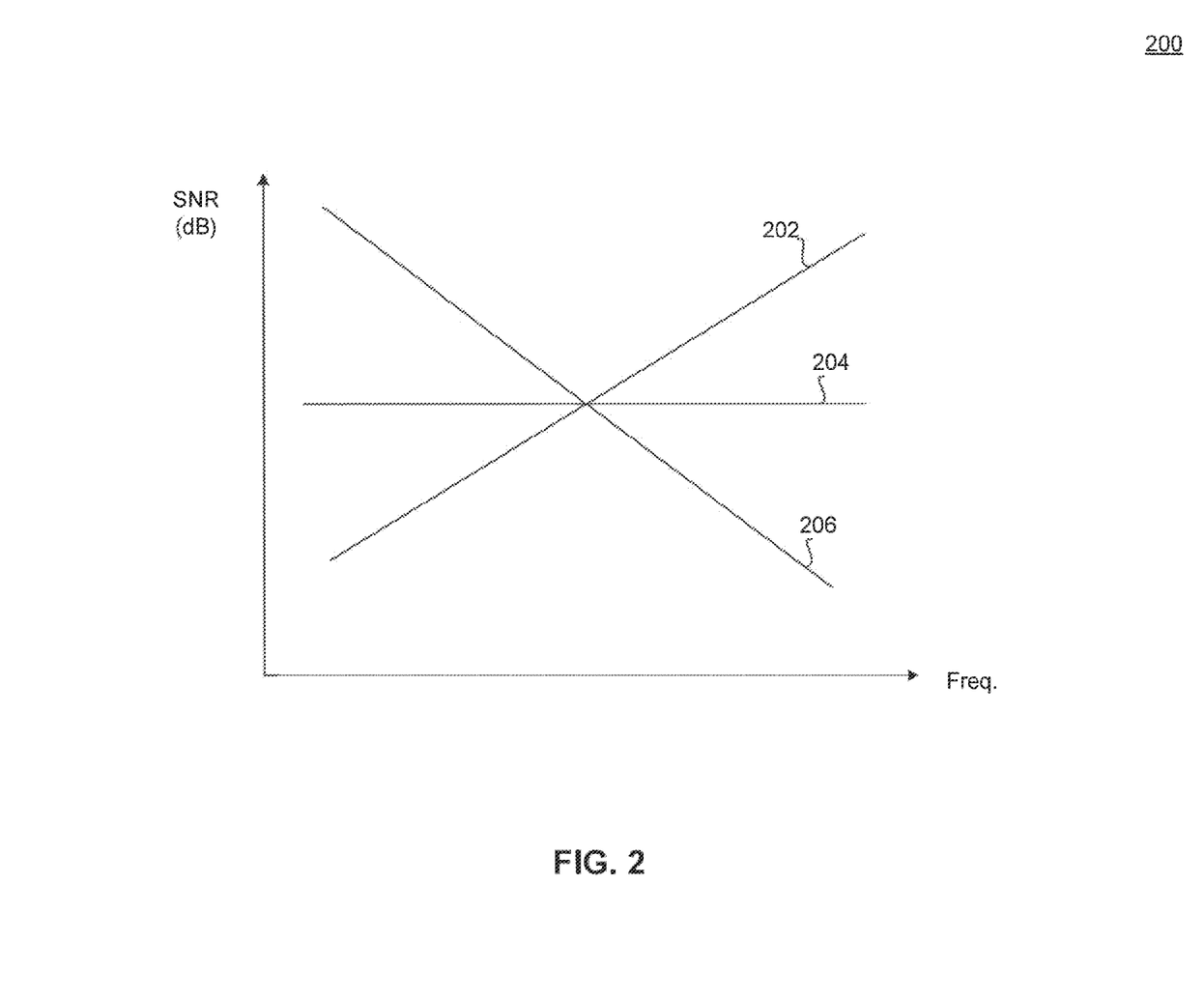
FIG. 2 shows example signal-to-noise ratio (SNR) versus frequency profiles of cable modems in a cable network.

With the above described characteristics of the upstream frequency spectrum and of coaxial cable, it is anticipated that cable modems will have different signal strength versus frequency profiles measured at the headend. This is illustrated in FIG. 2, for example, which shows example signal-to-noise ratio (SNR) versus frequency profiles of different CMs in a cable network. As would be understood by a person of skill in the art, the example SNR versus frequency profiles shown in FIG. 2 are illustrative only. In practice, actual SNR versus frequency profiles may or may not be linear as illustrated in FIG. 2. However, actual SNR versus frequency profiles will, nonetheless, exhibit certain characteristics as described below.

As shown in FIG. 2, profiles 202, 204, and 206 (which are associated with different CMs) exhibit different tilts (slopes) as a function of frequency. Specifically, in profile 202, the SNR improves as frequency increases. In contrast, in profile 206, the SNR degrades with frequency increasing. In profile 204, the SNR remains more or less constant with frequency changes.

Figure 9:
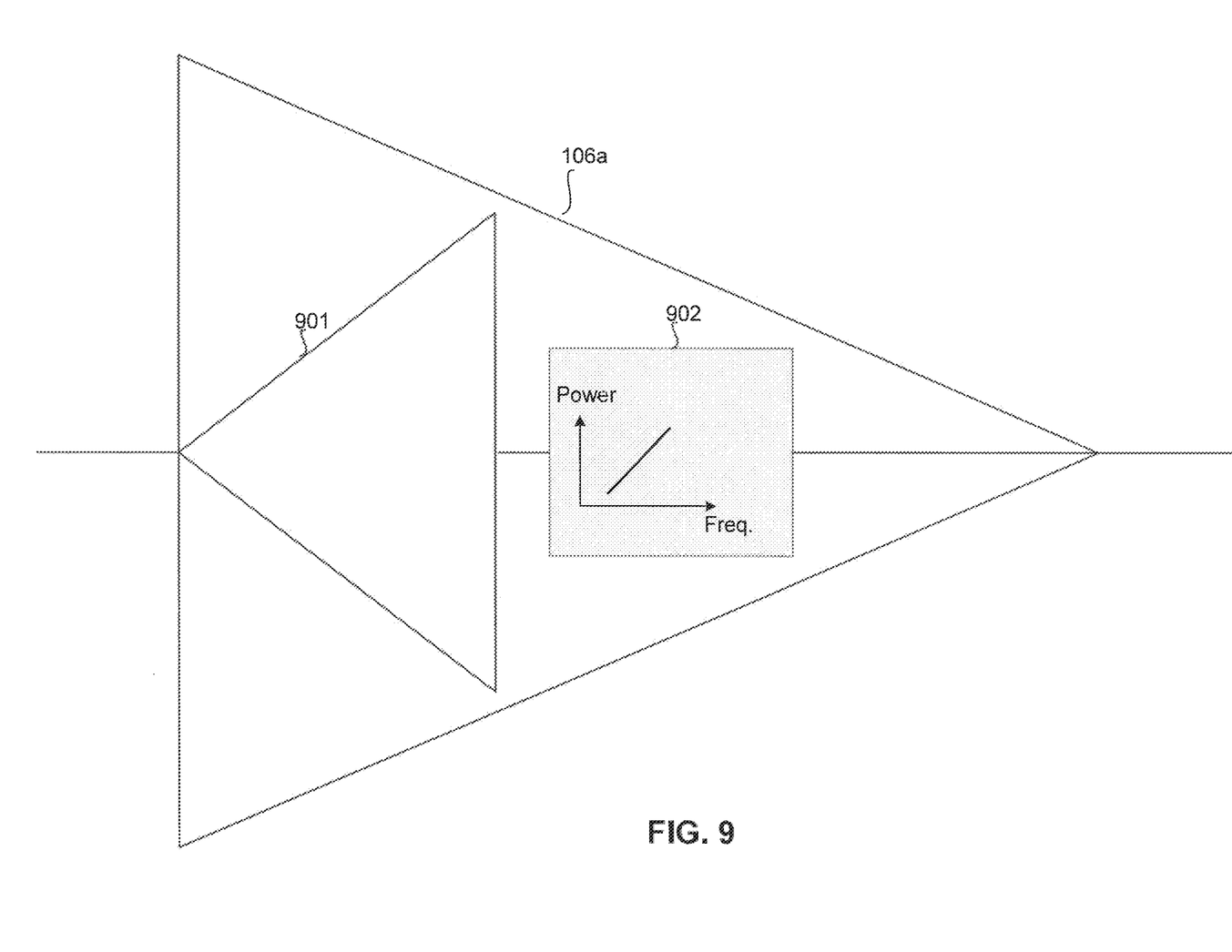
FIG. 9 illustrates an example amplifier according to an embodiment of the present disclosure.

Profiles 202, 204, and 206 typically result from CMs located at varying cable distances from the headend. For example, profiles 202, 204, and 206 may result from CMs 110a, 110c, and 110e, respectively, of cable network 100, described above. Particularly, for CM 110a, with CM 110a being close to amplifier 106a, cable and multiple tap loss is not a dominant factor in its SNR versus frequency profile. Instead, the SNR versus frequency profile of CM 110a is primarily affected by the (relatively constant) single tap 108a loss and the single feeder cable 109a loss connecting tap 108a to amplifier 106a, and the single drop cable 111a connecting CM 110a to tap 108a, where the cable losses increases with frequency. Particularly, the SNR of CM 110a improves with frequency increases as shown in profile 202 due to the fact that as shown in FIG. 9, upstream equalizer 902 at the input of upstream amplifier 901 produces more loss at lower frequencies to compensate for frequency dependent tilt in the upstream signal from the output of amplifier 106b (which traverses all the taps 108 and the connecting cable 109) to the input of amplifier 106a. In an embodiment, the equalizer 902 produces a flat signal spectrum from the output of upstream amplifier 106b at the input of upstream amplifier 901.

In contrast, for CM 110e, multiple tap insertion loss and interconnecting frequency dependent cable loss is the dominant factor in its SNR versus frequency profile, with CM 110e being distant from amplifier 106a. As such, the SNR of CM 110e decreases with frequency increases as shown in profile 206, with an increasing amount of signal attenuation in dB being attributed to cable loss (which is proportional to the square root of the frequency) as frequency increases.

Embodiments of the present disclosure exploit the above described anticipated tilts of signal strength (e.g., measured in terms of SNR) versus frequency profiles of CMs to reduce and/or optimize power utilization in a cable network. In particular, embodiments recognize that by pre-compensating the tilt of the upstream channel at the cable modem, higher power utilization efficiency can be achieved. As such, embodiments adapt the transmit power at the cable modem according to the upstream channel, so that the power used (and/or bit loading) for a given transmission is only as high as needed for a desired SNR at the headend. For example, when the transmission is scheduled over a frequency sub-band over which high SNR is anticipated, the transmit power is reduced appropriately. Similarly, when the transmission is scheduled over a sub-optimal frequency sub-band (i.e., over which low SNR is anticipated), the transmit power is increased as needed. Also, in the same manner, the transmit power (and/or bit loading) may be adapted according to the upstream channel over a wideband spectrum so that higher/lower power is used for different frequencies of the spectrum as needed. As a result of embodiments, similar SNR levels can be achieved at the headend irrespective of the transmission frequency used and/or the location of the cable modem from the headend.

Figure 3:
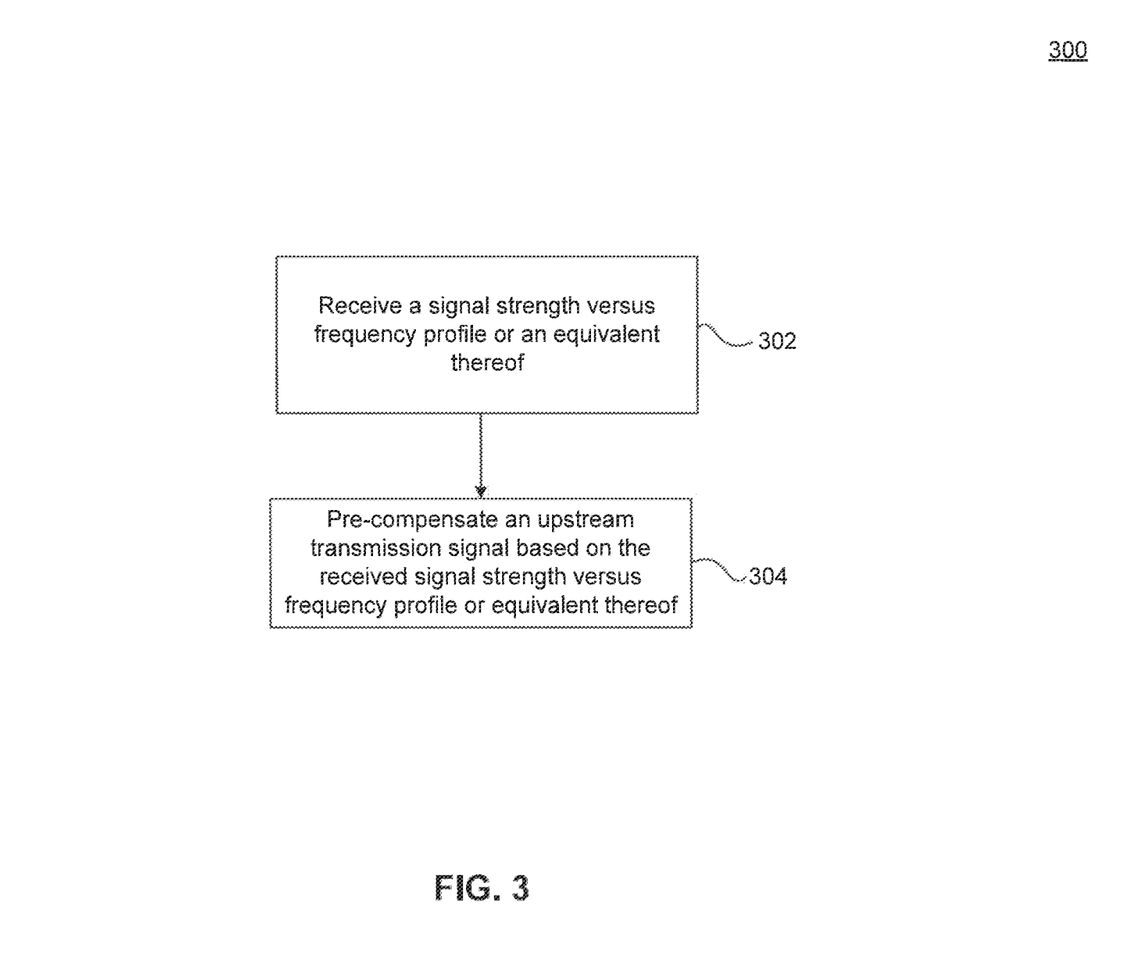
FIG. 3 is a process flowchart of a method of adaptive upstream channel tilt compensation according to an embodiment of the present disclosure.

FIG. 3 is a process flowchart 300 of a method of adaptive upstream channel tilt compensation according to an embodiment of the present disclosure. Process 300 may be performed at the cable modem, or at a cable modem termination system (CMTS) that sits between the cable modem and the headend.

As shown in FIG. 3, process 300 begins in step 302, which includes receiving a signal strength versus frequency profile of the cable modem or an equivalent thereof (e.g., BER versus frequency, etc.).

In an embodiment, the signal strength versus frequency profile of the CM is measured at the headend. Alternatively, the profile is measured at a CMTS that sits between the CM and the headend, and then provided to the headend. According to embodiments, the signal strength versus frequency profile of a CM is measured and/or updated every time the CM connects to the cable network and subsequently measured periodically. For example, at initialization, the headend may request that the CM transmit a test signal at different frequencies. The headend makes successive signal strength measurements based on the CM test transmissions, and determines the profile of the CM. In an embodiment, the headend determines the profile of the CM using a best fit model based on the CM test transmissions.

Figure 8:
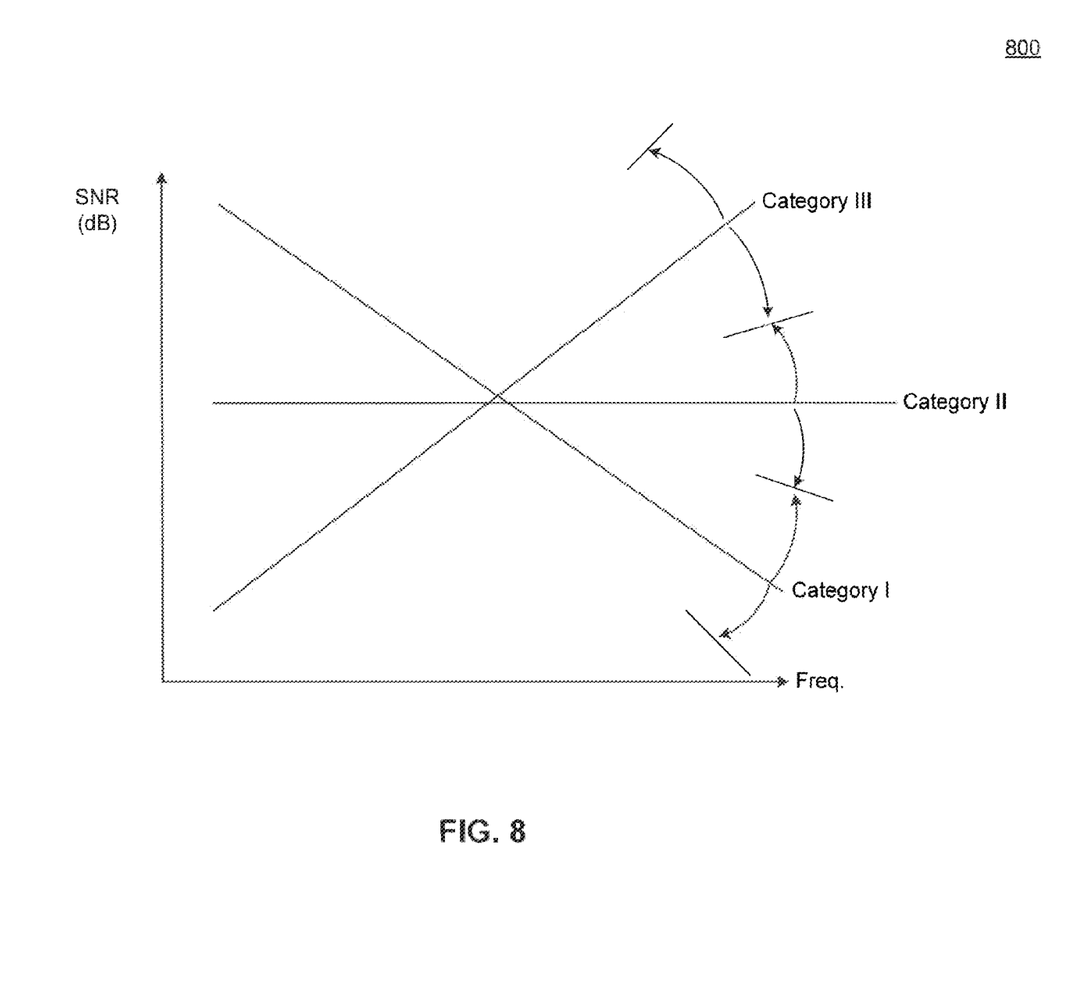
FIG. 8 is an example partition of the SNR versus frequency space that can be used to implement upstream channel tilt compensation in a cable network according to an embodiment of the present disclosure.

In another embodiment, CMs are grouped based on their SNR versus frequency profiles into multiple categories. The category that a CM belongs to governs pre-compensation at the CM. For example, as shown in the example of FIG. 8, the SNR versus frequency space may be partitioned into three categories I, II, and III. Each CM is associated with one of the categories based on the tilt (or slope) of its SNR versus frequency profile curve. This category information may be stored at the headend together with other identifying information of the CM. Subsequently, the category information (instead of the SNR versus frequency profile) is sent to and used by the CM. The category information of a CM may change over time with changes in upstream channel characteristics. Thus, according to embodiment, the category information may be communicated to the CM at periodic intervals or every time it changes, for example.

Referring back to FIG. 3, in step 304, process 300 includes pre-compensating an upstream transmission signal based on the received signal strength versus frequency profile or equivalent thereof. In an embodiment, step 304 includes pre-compensating the upstream transmission signal so as to reduce the tilt of the signal strength versus frequency profile of the CM as measured at the headend for the particular signal. In other words, step 304 results in the signal strength versus frequency profile being tilt compensated for the particular transmission, so as to counteract the signal strength versus frequency profile of the CM.

Figure 4:
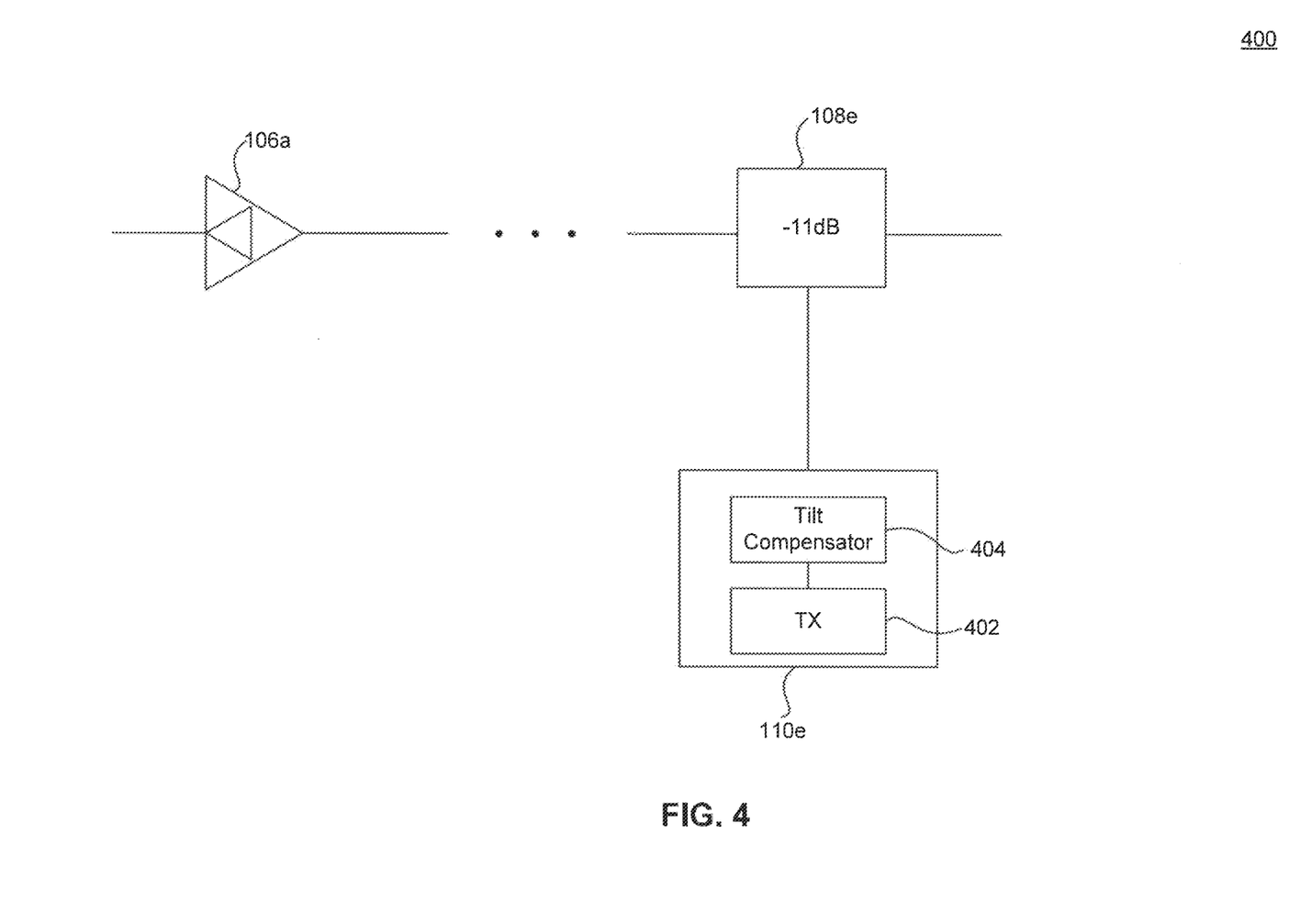
FIG. 4 is an example implementation of a cable modem with upstream channel tilt compensation according to an embodiment of the present disclosure.

In an embodiment, as shown in FIG. 4, pre-compensation is done within the CM before the upstream signal reaches the service line. According to this embodiment, the CM (e.g., CM 110e) includes a transmitter 402 and a tilt compensator 404. Tilt compensator 402 filters, power amplifies, shapes, and/or applies bit loading techniques to the transmit signal as appropriate. The output of CM 110e is thus pre-compensated according to the anticipated received signal strength versus frequency profile of the CM. By performing pre-compensation within the CM (i.e., before it reaches the service line) transmit pre-compensation is performed on a low power signal before power amplification and is can thus be done in a power efficient manner.

Pre-compensation within the CM can be implemented in various ways according to embodiments. For the purpose of illustration only, example implementations are provided in FIGS. 5-7.

Figure 5:
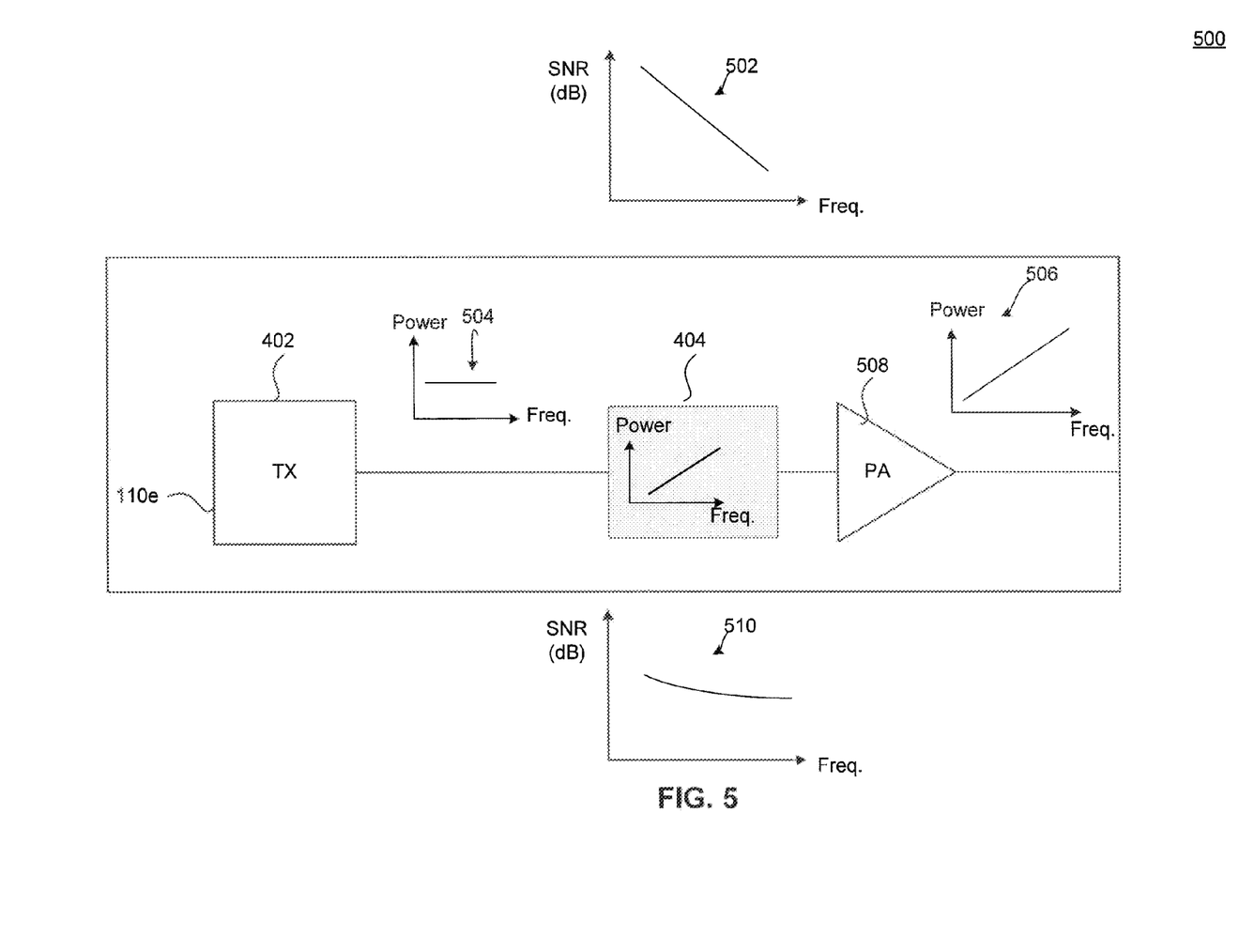
FIG. 5 is another example implementation of a cable modem with upstream channel tilt compensation according to an embodiment of the present disclosure.

FIG. 5 is an example implementation 500 of a cable modem with upstream channel tilt compensation according to an embodiment of the present disclosure. For illustration, it is assumed that the cable modem is characterized by an example (non-compensated) SNR versus frequency profile 502 as shown in FIG. 5.

According to example implementation 500, a CM (e.g., CM 110e) includes a transmitter 402, an equalizer filter 404, and a power amplifier (PA) 508. Equalizer 404 performs wideband power compensation of the input from transmitter 402 according to SNR versus frequency profile 502 and PA 508 increases the output power to the desired received level. For illustration, example power versus frequency profiles 504 and 506 of the input and output, respectively, of PA 508 are shown in FIG. 5. As shown, output power profile 506 is pre-compensated according to SNR versus frequency profile 502. In an embodiment, output power profile 506 is tilted in an opposite direction to SNR versus frequency profile 502. As such, at the headend, the resulting SNR versus frequency profile 510 from the pre-compensated signal has a reduced tilt compared to non-compensated profile 502. In an embodiment, the resulting profile 510 is more or less flat as a function of frequency.

According to embodiments, PA 508 is implemented as a variable amplifier. As such, PA 508 is adjusted according to changes in the SNR versus frequency profile 502 of the CM by varying the attenuation vs. frequency characteristic of equalizer 404. Further, PA 508 may be adjusted on individual upstream transmissions basis. Further, PA 508 may be implemented so as to pre-compensate the entire upstream spectrum or only particular sub-bands thereof. Pre-compensating only a sub-band is particularly useful when the CM is allowed to transmit only within that sub-band.

Figure 6:
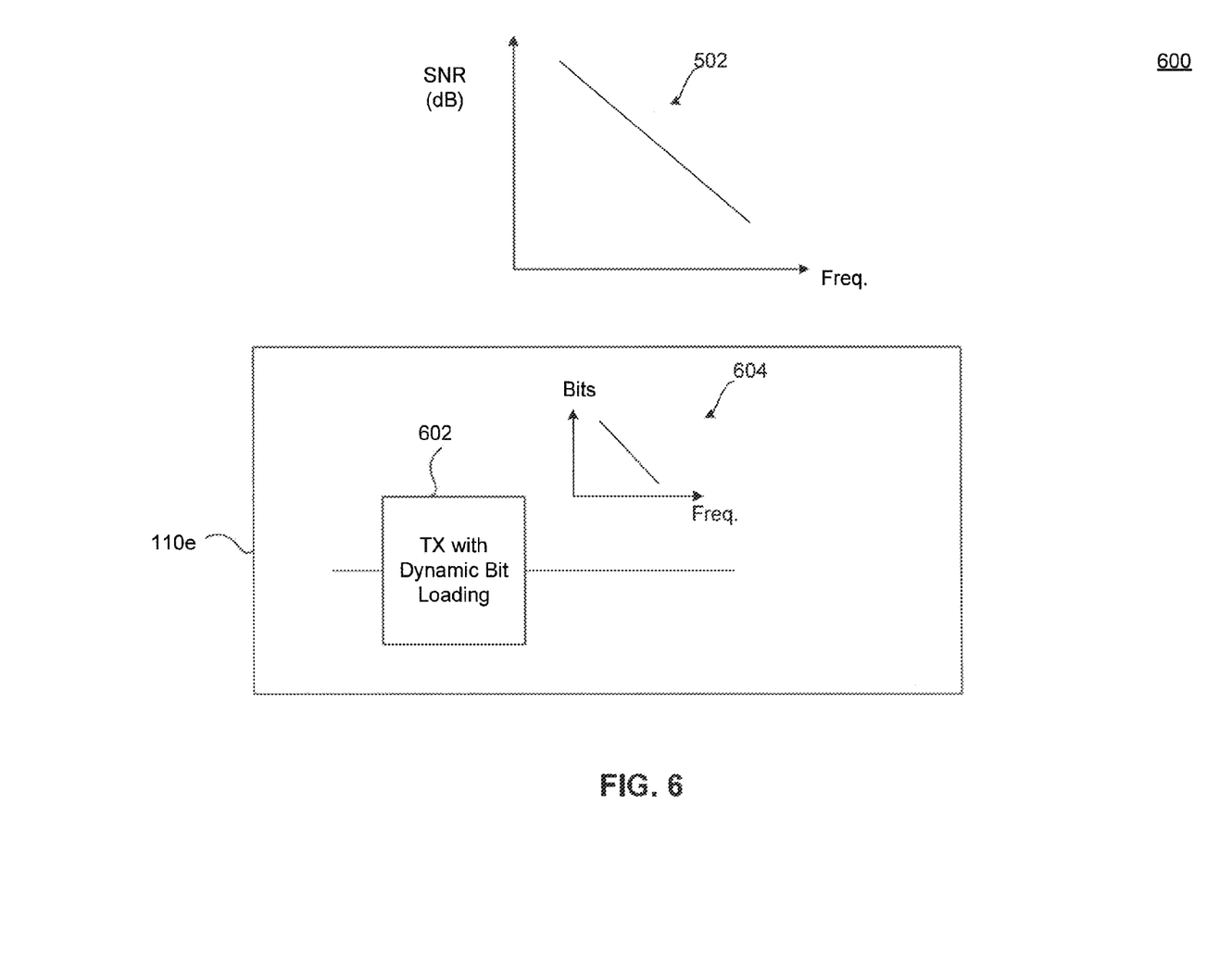
FIG. 6 is another example implementation of a cable modem with upstream channel tilt compensation according to an embodiment of the present disclosure.

In other embodiments, pre-compensation within the CM can be done by using bit loading techniques when power filtering/amplification range is insufficient to overcome excessive attenuation outside the compensation range of the CM. This is illustrated in FIG. 6, which shows another example implementation 600 of a cable modem with upstream channel tilt compensation according to an embodiment of the present disclosure. For illustration, it is assumed that the cable modem is characterized by an example (undercompensated) SNR versus frequency profile 502 as shown in FIG. 6.

According to example implementation 600, a CM (e.g., CM 110e) includes a transmitter 602 with dynamic bit loading features. Bit loading is a technique that allocates bits to be transmitted according to the quality of sub-channels (e.g., OFDM sub-channels or a single carrier within a channel bonded carrier group). In other words, more bits are transmitted over higher quality sub-channels, and less bits are transmitted over lower quality sub-channels. The overall effect of bit loading is that the SNR levels (at the headend) over higher and lower quality sub-channels are brought closer to each other, i.e., that the SNR versus frequency profile of the CM is tilt and modulation order (bit loading) compensated.

According to embodiments, transmitter 602 includes dynamic bit loading features. For example, transmitter 602 may include a bit loading module (not shown in FIG. 6) that performs bit loading functions. In an embodiment, bit loading in transmitter 602 is configurable according to the received SNR versus frequency profile 502 of the CM. For example, transmitter 602 may be configured to have a bit allocation versus frequency profile 604 as shown in FIG. 6, in order to obviate the undercompensated tilt in profile 502. The bit allocation versus frequency profile of transmitter 602 may be dynamically adjusted according to changes in profile 502 (due to transmit power pre-compensation, for example).

In an embodiment, transmitter 602 is assigned a bit allocation versus frequency profile based on the CM category of CM 110e. For example, transmitter 602 may be implemented with multiple configurations, each resulting in a different bit allocation versus frequency profile. The headend determines the category that CM 110e belongs, and instructs CM 110e to configure its transmitter 602 according to the determined category.

According to embodiments, tilt compensation using bit loading techniques may be used together with or independent of tilt compensation via transmit power filtering/amplification. In certain embodiments, both compensation techniques are used simultaneously to compensate severe tilts in the SNR versus frequency profile. This may be the case when wideband tilt compensation is needed, such as in future (i.e., expanded low and high frequency bands) upstream frequency spectra. However, the same embodiments may also be used in in networks with traditional (i.e., single low frequency band) frequency spectra.

Figure 7:
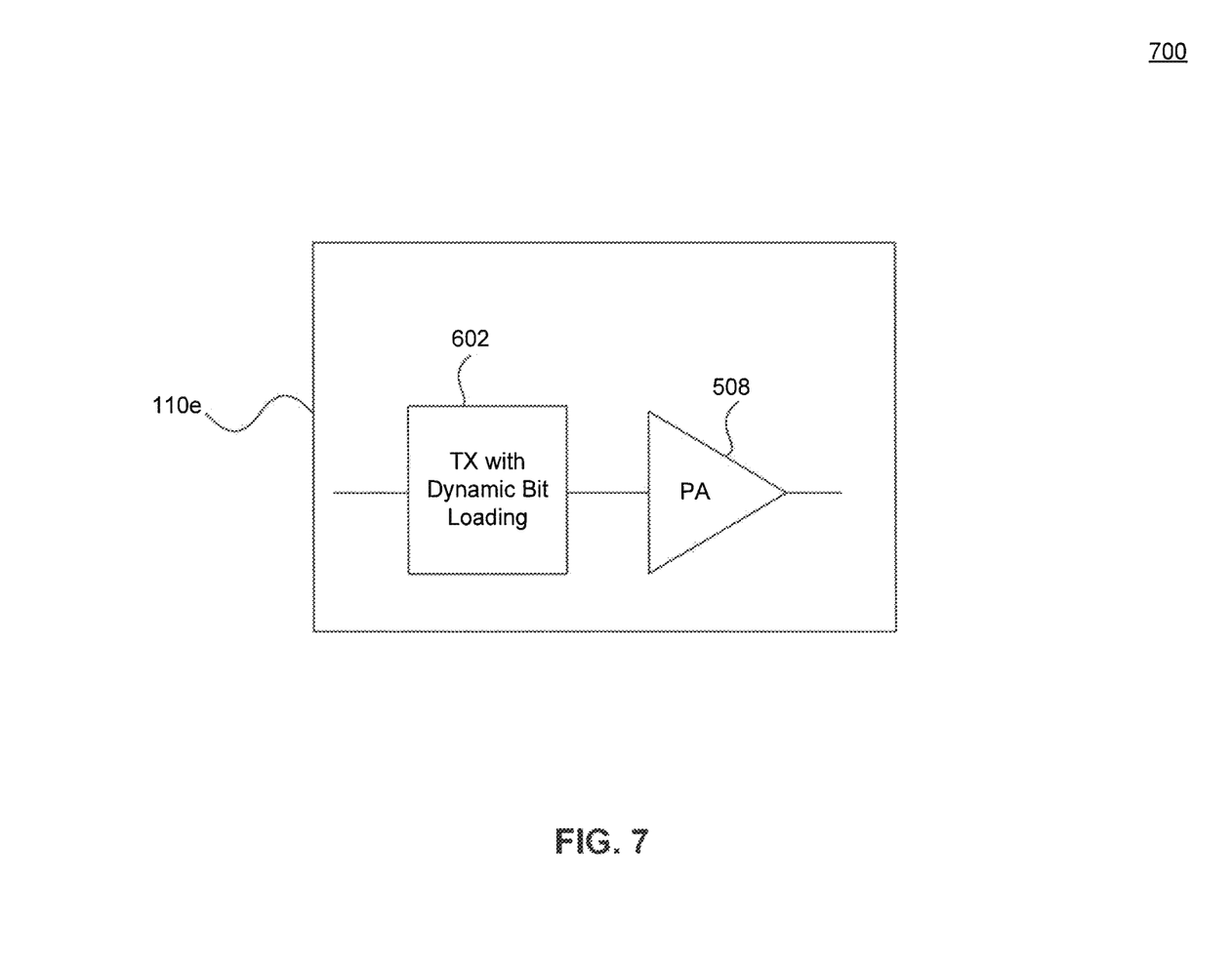
FIG. 7 is another example implementation of a cable modem with upstream channel tilt compensation according to an embodiment of the present disclosure.

FIG. 7 is an example implementation 700 of a cable modem with upstream channel tilt compensation according to an embodiment of the present disclosure. As shown in FIG. 7, example implementation 700 employs both types of tilt compensation techniques. As such, CM 110e includes both a transmitter 602 with dynamic bit loading and a wideband transmit PA 508. The bit loading features of transmitter 602 together with the wideband power compensation features of PA 508 contribute in respective degrees to tilt compensation.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method of adaptive upstream channel tilt compensation in a high speed data network, comprising:
   receiving, by a cable modem, an indication of a signal strength versus frequency profile of the cable modem, wherein the signal strength versus frequency profile provides signal strength values corresponding to a range of frequencies of an upstream channel based on a signal transmitted by the cable modem; and
   pre-compensating, by the cable modem, an upstream transmission signal from the cable modem based on the received indication,
   wherein the indication includes the signal strength versus frequency profile of the cable modem, and
   wherein the signal strength versus frequency profile of the cable modem is measured at a headend of the high speed data network.

2. The method of claim 1, wherein the signal strength versus frequency profile of the cable modem is measured or updated every time the cable modem connects to the high speed data network.

3. The method of claim 1, wherein the indication includes a category of the cable modem, the cable modem associated with the category based on the signal strength versus frequency profile of the cable modem.

4. The method of claim 3, wherein the cable modem is associated with the category based on a tilt of the signal strength versus frequency profile of the cable modem.

5. The method of claim 1, wherein said pre-compensating comprises:
   reducing a tilt of the signal strength versus frequency profile of the cable modem for the upstream transmission signal.

6. The method of claim 1, wherein said pre-compensating comprises:
   power shaping the upstream transmission signal from the cable modem based on the received indication of the signal strength versus frequency profile of the cable modem.

7. The method of claim 1, wherein said pre-compensating comprises:
   applying bit loading to the upstream transmission signal from the cable modem based on the received indication of the signal strength versus frequency profile of the cable modem.

8. The method of the claim 1, wherein said pre-compensating is further performed at one or more of: a service line tap, a high power amplifier, and a cable modem termination system (CMTS) of the high speed data network.

9. A cable modem, comprising:
   a transmitter configured to generate an upstream transmit signal; and
   a tilt compensator configured to pre-compensate the upstream transmit signal based on a received upstream signal strength versus frequency profile of the cable modem, wherein the upstream signal strength versus frequency profile provides signal strength values corresponding to a range of frequencies of an upstream channel based on a signal transmitted by the cable modem,
   wherein the upstream signal strength versus frequency profile of the cable modem is measured at a headend or cable modem termination system (CMTS) of the high speed data network, wherein the CMTS is located between the cable modem and the headend of the high speed data network.

10. The cable modem of claim 9, wherein the tilt compensator is further configured to power shape the upstream transmit signal based on the upstream signal strength versus frequency profile of the cable modem.

11. The cable modem of claim 9, wherein the tilt compensator is further configured to apply bit loading to the upstream transmit signal based on the upstream signal strength versus frequency profile of the cable modem.

12. The cable modem of claim 9, wherein the tilt compensator includes a power amplifier, wherein the power amplifier is configured to perform wideband compensation of the upstream transmit signal according to the upstream signal strength versus frequency profile of the cable modem.

13. The cable modem of claim 12, wherein the power amplifier is a variable power amplifier.

14. The cable modem of claim 9, wherein the tilt compensator includes a bit loading module.

15. The cable modem of claim 14, wherein the bit loading module is dynamically adjustable according to changes in the upstream signal strength versus frequency profile of the cable modem.

16. The cable modem of claim 14, wherein the bit loading module is configurable according to a bit allocation versus frequency profile based on an assigned category of the cable modem.

17. A method of adaptive upstream channel tilt compensation in a high speed data network, comprising:
   receiving, by a cable modem, an indication of a signal strength versus frequency profile of the cable modem, wherein the signal strength versus frequency profile provides signal strength values corresponding to a range of frequencies of an upstream channel based on a signal transmitted by the cable modem; and
   pre-compensating, by the cable modem, an upstream transmission signal from the cable modem based on the received indication;
   wherein the indication includes the signal strength versus frequency profile of the cable modem; and
   wherein the signal strength versus frequency profile of the cable modem is measured at a cable modem termination system (CMTS) of the high speed data network, and wherein the CMTS is located between the cable modem and a headend of the high speed data network.

18. The method of claim 17, wherein the indication includes a category of the cable modem, the cable modem associated with the category based on the signal strength versus frequency profile of the cable modem.

19. The method of claim 18, wherein the cable modem is associated with the category based on a tilt of the signal strength versus frequency profile of the cable modem.

20. The method of claim 17, wherein said pre-compensating comprises: reducing a tilt of the signal strength versus frequency profile of the cable modem for the upstream transmission signal.

21. The method of claim 17, wherein said pre-compensating comprises: applying bit loading to the upstream transmission signal from the cable modem based on the received indication of the signal strength versus frequency profile of the cable modem.

* * * * *

UNITED STATES PATENT AND TRADEMARK OFFICE
CERTIFICATE OF CORRECTION

| | | |
|---|---|---|
| PATENT NO. | : 8,776,155 B2 | Page 1 of 1 |
| APPLICATION NO. | : 13/453533 | |
| DATED | : July 8, 2014 | |
| INVENTOR(S) | : Richard Prodan | |

It is certified that error appears in the above-identified patent and that said Letters Patent is hereby corrected as shown below:

In the Claims

Column 8, lines 9-10, please replace "channel based on" with --channel, based on--.

Signed and Sealed this
Fourteenth Day of October, 2014

Michelle K. Lee
*Deputy Director of the United States Patent and Trademark Office*